United States Patent [19]

d'Augereau

[11] Patent Number: 4,904,288
[45] Date of Patent: Feb. 27, 1990

[54] FILTER ELEMENT FOR CIRCULATING AIR SYSTEMS

[75] Inventor: Robert D. d'Augereau, 90 Luke Dr., 106-C, Lafayette, La. 70506

[73] Assignees: Mike D. Shoffiett; Robert D. d'Augereau, both of Rayne, La.

[21] Appl. No.: 369,148

[22] Filed: Jun. 21, 1989

[51] Int. Cl.[4] ............................................. B01D 46/10
[52] U.S. Cl. ........................................ 55/485; 55/487; 55/515; 55/518; 55/525; 55/528; 55/DIG. 31
[58] Field of Search ................. 55/318, 320, 321, 323, 55/485–487, 492, 515, 518, 525, 528, DIG. 31

[56] References Cited

U.S. PATENT DOCUMENTS

| | | | |
|---|---|---|---|
| 4,017,100 | 4/1977 | Gehrig et al. | 55/487 X |
| 4,141,703 | 2/1979 | Mulchi | 55/487 X |
| 4,227,904 | 10/1980 | Kasmark et al. | 55/487 X |
| 4,518,402 | 5/1985 | Dargel | 55/DIG. 31 X |

Primary Examiner—Charles Hart
Attorney, Agent, or Firm—James L. Bean

[57] ABSTRACT

A reusable air filter assembly for use in forced air heating and cooling systems includes an inlet stage filter medium consisting of a single layer of fabric woven in an egg-crate pattern and of relatively coarse polypropylene yarn, an outlet stage filter medium consisting of two layers of fabric woven in an egg-crate pattern of relatively fine polypropylene yarn and a precipitation chamber between said inlet stage and said outlet stage defined by a corrugated aluminum wire screen, with the precipitation chamber having a thickness, in the direction of air flow through the assembly, which is at least equal to the combined thickness of the inlet stage filter medium and the outlet stage filter medium. The filter assembly is supported in a corrosion resistant frame by opposing grid covers of expanded metal having a low friction coating thereon.

6 Claims, 2 Drawing Sheets

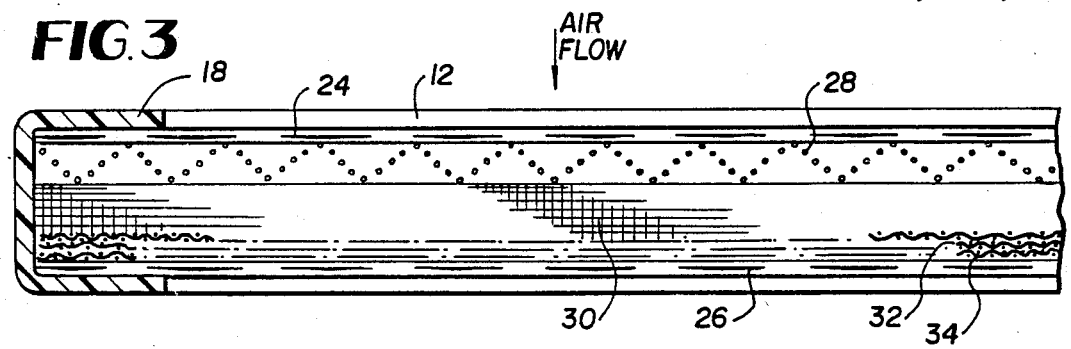
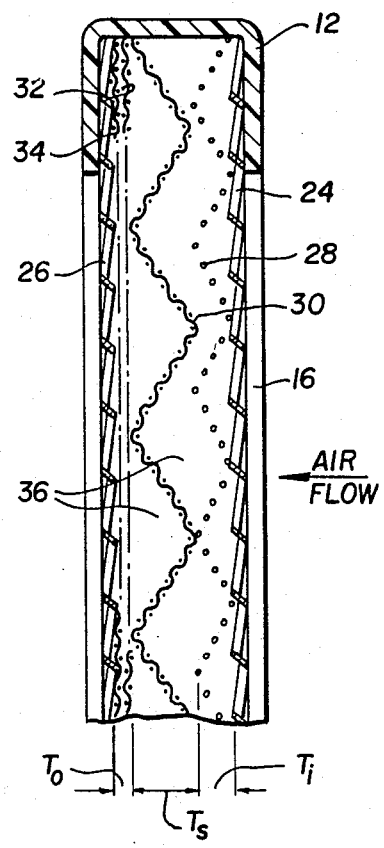
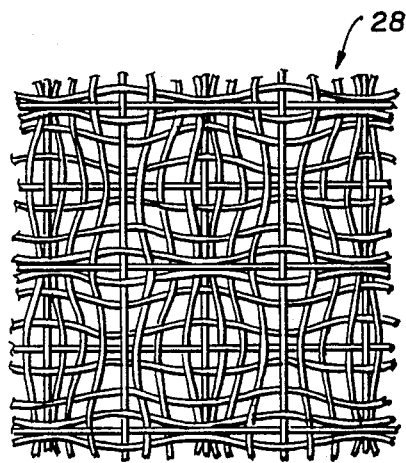
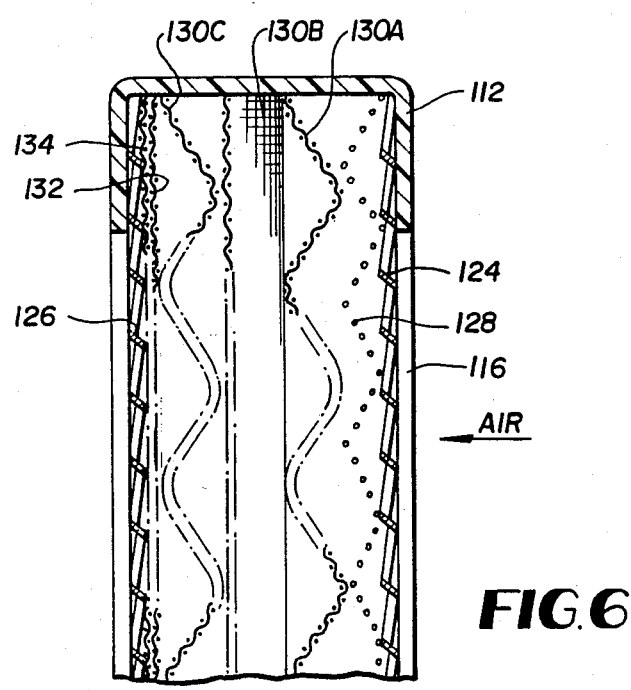

FILTER ELEMENT FOR CIRCULATING AIR SYSTEMS

BACKGROUND OF THE INVENTION

1. Field of the Invention

This invention relates to filter elements for removing dust and other solid particles from air in a circulating air system, and more particularly to an improved reusable filter element which is intended to last for the life expectancy of a circulating air system such as a residential or commercial heating and air conditioning system with which it is used.

2. Description of the Prior Art

Reusable air filter elements for use in circulating air systems have been known for many years and numerous filter elements of this type are commercially available. The known reusable filter elements have not met widespread acceptance, however, particularly for use in residential and light commercial applications, despite their obvious potential economic advantages, and the single use or throw away filter element continues to be used in the vast majority of such systems.

One difficulty with the known prior art reusable filters is that, when such units were made sturdy enough to withstand repeated and aggressive cleanings, as by high pressure water streams, the filtering media were frequently ineffective in removing fine dust particles. To avoid this defect, multiple layers of filtering medium, reinforced with metal supporting grids have been used, but this construction can result in increased flow resistance to the air passing through the filtering unit with a consequent reduction in efficiency of the overall heating and/or air conditioning system.

One prior art reusable air filter element is disclosed in U.S. Pat. No. 2,724,457 and employs a plurality of layers of electrostatic fabric woven from yarns of vinyl material such as vinyl chloride or a polyvinylidene such as seran retained in a generally rectangular frame by suitable means such as diagonally extending rods or by a grid or screen on the front and back of the filter and with at least one screen disposed between layers of the superimposed filter fabric to provide additional air pockets. In one embodiment, the filter screen has crimps or spaced projections in its central portion to cause the center of the filter assembly to bow outward. The layers of filter medium are all of the same vinyl fabric which is woven with irregularly shaped projections or pockets to disturb the flow of air through the filter and facilitate trapping of the dust particles by the electrostatic material.

U.S. Pat. No. 4,518,402 also discloses a reusable air filter employing a self-charging electrostatic filter fabric with at least one stage of the filter being three dimensional and folded over on itself to retain its filtering characteristics and provide a biasing force retaining other filter media in spaced relation. Expanded metal screens are provided on the front and back of the assembly and ties are provided to hold the adjacent filter elements outwardly in contact with the retaining screens.

Another known reusable filter comprises a single layer of open cell foam material supported in a frame by a metallic grill contacting one surface of the foam sheet and a removable retaining bar assembly on the other side whereby the foam sheet may be removed from the frame to facilitate cleaning by washing operation.

To the best of applicant's knowledge, none of the prior art filters described above have met wide scale acceptance. In the case of the known filters employing multiple fabric layers superimposed one upon the other, when sufficient layers of fabric are used to effectively filter fine dust particles and the like from air, flow resistance becomes unacceptable. Similarly, with respect to the open cell foam material, flow resistance, particularly after accumulation of dust particles, results in severe energy loss and loss in efficiency of the circulating air system.

It is an object of the present invention to overcome the deficiencies of the known prior art reusable filters by providing a simple, efficient filter structure which will effectively remove dust and other solid particles from an air stream while providing minimum resistance to air flow through the filter.

Another object is to provide such a filter system which can be easily and repeatedly cleaned without damage to the filter.

Another object of the invention is to provide such a filter constructed of materials which will not be damaged by atmospheres, including salt atmospheres, normally encountered in residential and light commercial heating and air conditioning systems.

SUMMARY OF THE INVENTION

The foregoing and other objects and advantages of the invention are achieved in accordance with the present invention in which an efficient air filter is supported in a rigid frame constructed from a corrosion resistant material such as a fiberglass reinforced synthetic resin frame retained in assembled relation by suitable means such as corrosive resistant metallic angle brackets. The air filtering medium is retained in the frame by front and back expanded metal grills having a highly smooth, durable and flexible coating to minimize flow resistance.

The filter is stage-loaded in that it is designed to be used in one direction only, with the upstream side or first stage of the filter element consisting of a first layer or sheet of woven polypropylene fabric formed from relatively heavy denier yarns or strands woven into a generally egg-crate or hills-and-valleys pattern which maximizes the eddy currents in the air stream flowing through the first stage of the filter.

The second stage of the filter consists of a layer of an anodized aluminum screen which is corrugated to provide a low velocity flow chamber, with the openings in the screen being disposed at varying angles with regard to the direction of flow through the assembly to further facilitate generation of eddies and promote solid particle removal by a snow fence type phenomenon.

The third or final stage of the filter, at the exit side, consists of two superimposed sheets of polypropylene fabric woven from relatively light denier yarn or fiber, again in an egg-crate design, with the total thickness of the final stage being much less than the first stage and with the egg-crate design being relatively fine so as to promote removal of extremely fine dust particles, pollen and the like.

The complete assembly may be rigidized by ties extending through the filter assembly securing the expanded metal grids on each side to one another, thereby preventing shifting of the respective filter elements during use and during cleaning.

BRIEF DESCRIPTION OF THE DRAWINGS

The foregoing and other features and advantages of the invention will be apparent from the detailed description contained hereinbelow, taken in conjunction with the drawings, in which:

FIG. 3 is a fragmentary sectional view taken on line 3—3 of FIG. 2;

FIG. 4 is a view similar to FIG. 3 and taken on line 4—4 of FIG. 2;

FIG. 5 is an enlarged fragmentary view of the polypropylene filter element used as the initial stage of the filter, the final stages being similar to but of a much thinner fabric formed from a finer yarn which is more tightly woven; and FIG. 6 is a view similar to FIG. 4 showing an alternate embodiment of the invention.

DESCRIPTION OF THE PREFERRED EMBODIMENTS

Figure 1:
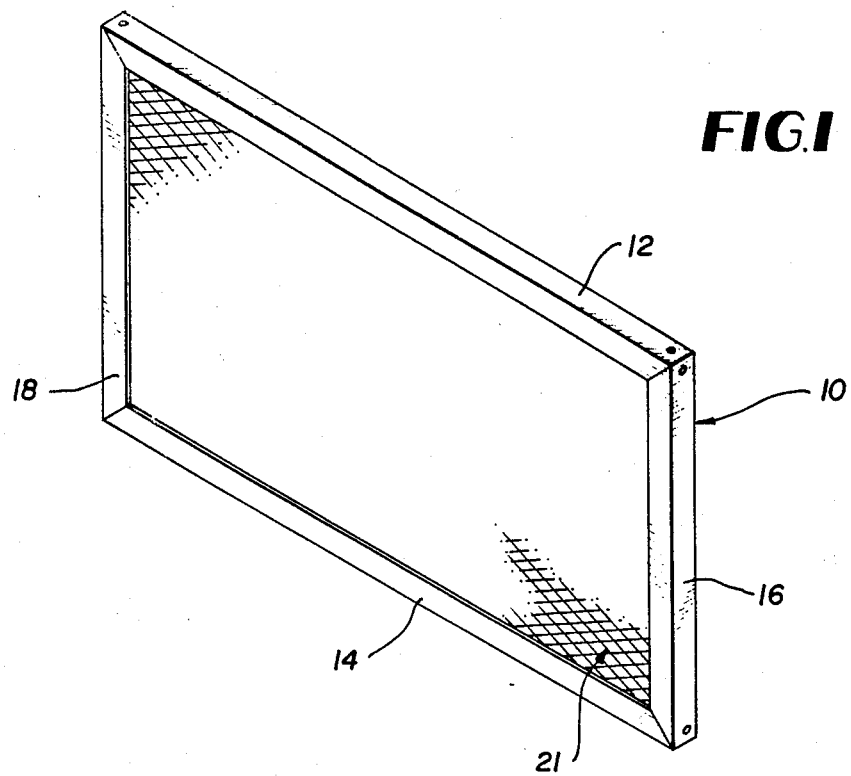
FIG. 1 is an isometric view of an air filter according to the present invention.
Figure 2:
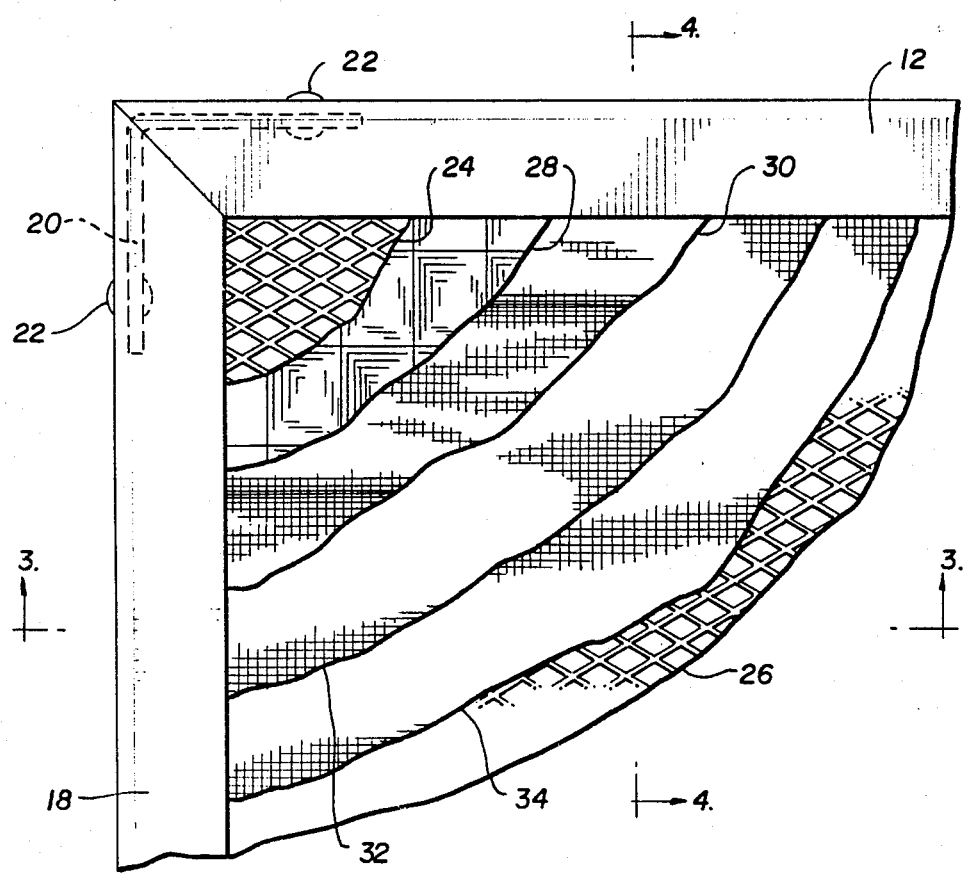
FIG. 2 is an enlarged fragmentary elevation view of the filter assembly shown in FIG. 1.

Referring now to the drawings in detail, an improved reusable filter for use in a forced air circulating system in accordance with the present invention is indicated generally by the reference numeral 10 in FIG. 1 and comprises a rigid generally rectangular frame made up of top and bottom elongated channel shaped frame members 12, 14, respectively, and similar end members 16, 18, respectively. The frame members are retained in assembled relation by corrosion resistant rigid metal angle brackets 20 supported by suitable fasteners such as anodized aluminum rivets 22 as best seen in FIG. 2. A staged stack of filter elements indicated generally at 21 is supported within frame 10 between front and rear relatively rigid expanded metal retaining grid members 24 & 26. The filter stack comprises a front filter element in the form of a first sheet of filter fabric 28 woven from relatively heavy polypropylene yarns. A central core 30 is defined by a corrugated sheet of anodized aluminum screen, and the final filter stage comprises an inner sheet of polypropylene filter fabric 32 and an outer sheet of polypropylene filter fabric 34. Sheets 32 and 34 may be identical and superimposed one upon the other as seen in FIGS. 3, 4 and 6.

The channel shaped frame members 12, 14, 16 and 18 may be formed of any suitable, dimensionally stable and corrosion resistent material but preferably are formed of a heat resistent, fiberglass-reinforced synthetic resin material capable of withstanding repeated cleaning by use of high pressure water streams with or without detergent.

The expanded metal grids 24,26 are coated to reduce air flow resistance. A coating material providing a very smooth, low friction surface and capable of covering uneven edges produced in the manufacture of the expanded metal should be used. One suitable coating has been found to be a HERESITE paint which is a high temperature resistent, flexible and chip resistant paint, although other paints or coating materials may be satisfactory.

The layers of filter media or fabric 28, 32 and 34 are each woven from a polypropylene yarn, and the weave pattern is designed to facilitate air flow while producing eddy currents tending to cause or facilitate removal of solid particles from the air. A "hills and valleys" or egg-crate design has been found to be highly efficient in this respect in that dust and solid contaminants tend to collect in the valleys and on the downstream side of the fabric, leaving open channels in the higher (upstream) areas of the fabric even when the filter is dirty, i.e., has accumulated substantial solids filtered from the air.

The relatively coarse weave and larger diameter yarns of the first stage filter medium fabric is effective in directly filtering larger particles such as small fibers, lint, and the like from the air stream, and these larger particles tend to collect in the valleys or low (downstream) areas of the filter fabric. The peak and valley configuration of this filter medium produces a continuously changing surface to the incoming air stream from the peak to the valley, thereby producing eddies in the air flow on the downstream side of the first stage to promote the removal of dust particles in the low velocity precipitation chamber 36 of the filter defined by the corrugated metal screen 30. As shown in FIG. 4, the total thickness of the filter medium $T_s$ defined by the corrugated screen is at least equal to the combined thickness $T_i$ of the inlet or first stage polypropylene filter fabric and the thickness $T_o$ of the final or outlet stage defined by the two layers of polypropylene filter fabric.

The thickness of the low velocity chamber 36, in combination with the additional eddies produced by the air flowing through the openings in the screen, results in a highly efficient precipitation of solid particles in the interior of the filter. Finally, the closer weave and finer yarn size of the final filter stage, again in combination with the peak and valley configuration producing eddies in this final stage, results in removal of a surprisingly large percentage of extremely fine particles of dust and pollen from air stream flowing through the filter. This is accomplished while producing minimum air flow resistance with a consequent increase in efficiency of the overall forced air circulating system.

Although nonsymmetrical filter construction per se is known in which filter elements having larger openings are located on the air inlet side with progressively smaller openings toward the outlet side, the large low velocity precipitation chamber within the filter of the present invention has resulted in a surprisingly efficient filter with the use of a minimum of filter media layers and without requiring use of filter media with extremely small openings which produce excessive flow resistance. Thus, effective removal of solid contaminating particles is achieved without the use of thicker more dense filtering media and the consequent restriction on air flow and need for frequent filter cleaning of such prior art nonsymmetrical filters.

In one filter according to the present invention which has been found to be highly efficient in residential and small commercial heating and air conditioning systems, the first filter medium is woven from monofilament polypropylene yarns or threads with approximately 18 threads per inch in one direction and approximately 24 threads per inch in the opposite direction. The relatively large diameter of the threads used in the egg-crate or peak-and-valley construction results in the total thickness of the sheet of fabric, measured in the direction of air flow, is approximately 3/16 inch. By contrast, the final stage filter fabric is woven from monofilament threads of approximately ½ the diameter of the first stage threads and the thread count in each direction is approximately double the number of threads in the first filter medium. The total thickness of the two layers of fabric constituting the final stage is approximately ½ the total thickness of the first stage layer. While this construction results in a relatively open filter, i.e., a filter having relatively large openings and a consequent low resistance to air flow, the filter has been found to be highly efficient in the removal of very fine dust particles, pollen, and the like. This is accomplished only because of the structure producing the eddy currents in the flow through the relatively open, low velocity central precipitation chamber in the filter enabling the efficient precipitation of the fine dust particles on the internal screen element and the fabric filter media.

FIG. 5 is a diagramatic illustration of a type of woven fabric which may be used in accordance with the present invention. It is to be understood that this figure is intended only to illustrate the peak and valley, open weave construction of the filter media fabric and no attempt has been made to accurately represent either the number of yarns or the precise orientation of the yarns relative to one another. It is apparent, however, that an irregular pattern of openings is presented to the air stream from one yarn to the next which result in the highly turbulent flow downstream of the respective fabric elements which is highly conducive to precipitation of entrained solid particles moving in the air stream.

Referring to FIG. 6 of the drawings, an alternate embodiment of the invention is illustrated in which a larger low velocity central precipitation chamber is provided between the first and final filter stages by providing three layers 130A, 130B and 130C of corrugated aluminum screen intermediate the first stage filter fabric 128 and the second stage filter fabric layers 132, 134. The retaining grid layers 124, 126 having a smooth coating thereon are employed in the same manner described above. In this embodiment of the invention, all elements are substantially identical to that of the previously described embodiment except for the overall thickness of the filter produced by the additional layers of corrugated screen. Where dimensions permit, this additional thickness results in a more efficient air filtration.

While it is apparent that various modifications may be made, it is important that the low velocity precipitation chamber defined by the corrugated screen core have a total thickness which is at least equal to the combined thickness of all layers of woven polypropylene filter media.

While I have disclosed and described preferred embodiments of the invention, it will be apparent that various modifications may be employed. Accordingly, it should be understood that the invention is not restricted to the embodiments disclosed but rather that it is intended to include all embodiments which are apparent to one skilled in the art and which come within the spirit of the invention.

I claim:

1. A reusable air filter assembly for removing solid particles entrained in and flowing with an air stream to be filtered, comprising,
   an inlet stage filter medium consisting of a single layer of fabric woven from polypropylene yarn in an egg-crate pattern producing high and low surface areas in the direction of air flow through the filter assembly,
   an outlet stage filter medium consisting of two layers of fabric woven from polypropylene yarn in an egg-crate pattern producing high and low surface areas in the direction of air flow through the filter, said two layers being in overlying relation with the egg-crate pattern producing air spaces between the two layers, the polypropylene yarn employed to weave the outlet stage filter medium being smaller and the weave substantially closer than in the first stage filter medium,
   a low velocity precipitation chamber between said inlet stage filter medium and said outlet stage filter medium, said low velocity precipitation chamber being defined and maintained by a layer of corrugated metal screen engaging and separating said inlet and outlet layer filter media, said low velocity precipitation chamber having a thickness, measured in the direction of flow of air through the filter, which is at least equal to the combined thickness of the filter media of the inlet and outlet stages,
   expanded metal grid members extending over the inlet side of the inlet stage filter medium and the outlet side of the outlet stage filter medium, and
   a rigid, corrosion resistant frame extending around the periphery of and supporting the filter assembly and said grid members.

2. The air filter assembly defined in claim 1 wherein said polypropylene yarn used to weave said inlet stage filter medium and said outlet stage filter medium are monofilament yarns.

3. The air filter assembly defined in claim 2 wherein the diameter of the monofilmment yarn used to weave said inlet stage filter medium is about double the diameter of the monofilament yarn used to weave said outlet stage filter medium and wherein the thread count, in each direction of said outlet stage filter medium is about double that of the thread count of the inlet stage filter medium.

4. The air filter assembly defined in claim 3 wherein said corrugated metal screen is an anodized aluminum screen and wherein said expanded metal grill members are expanded anodized aluminum sheet metal.

5. The air filter assembly defined in claim 4 wherein said expanded metal grill members are each coated with a low friction, durable coating material to reduce the resistance to the flow of air through the filter assembly.

6. The air filter assembly defined in claim 3 wherein said layer of corrugated metal screen comprises a plurality of layers of corrugated aluminum screen wire supported in overlying relation with the corrugations of adjacent layers running at substantially right angles to one another.

* * * * *